United States Patent [19]
Ohga et al.

[11] Patent Number: 5,345,433
[45] Date of Patent: Sep. 6, 1994

[54] OPTICAL DISC RECORDING APPARATUS AND OPTICAL DISC REPRODUCING APPARATUS

[75] Inventors: Norio Ohga, Tokyo; Katsuaki Tsurushima, Kanagawa, both of Japan

[73] Assignee: Sony Corporation, Tokyo, Japan

[21] Appl. No.: 877,855

[22] Filed: May 4, 1992

[30] Foreign Application Priority Data

May 9, 1991 [JP] Japan .................. 3-132113

[51] Int. Cl.$^5$ .............................................. G11B 7/00
[52] U.S. Cl. ...................................... 369/54; 369/59; 369/124; 369/47
[58] Field of Search ............... 369/124, 54, 58, 59, 369/48, 47, 32, 202, 34, 36; 360/73.2, 72.1, 73.03

[56] References Cited

U.S. PATENT DOCUMENTS

| | | | |
|---|---|---|---|
| 5,199,019 | 3/1993 | Matsumura et al. | 360/73.03 |
| 5,214,631 | 5/1993 | Maeda et al. | 369/59 |
| 5,243,588 | 9/1993 | Maeda et al. | 369/54 |

FOREIGN PATENT DOCUMENTS

| | | |
|---|---|---|
| 0384073 | 8/1990 | European Pat. Off. |
| 2112502 | 6/1972 | France . |
| 1362588 | 8/1974 | United Kingdom . |

*Primary Examiner*—Aristotelis Psitos
*Assistant Examiner*—Nabil Hindi
*Attorney, Agent, or Firm*—Limbach & Limbach

[57] ABSTRACT

An optical disc recording apparatus in which audio data obtained by digitizing analog audio signals and time base compressing the resulting digital audio signals are read from a buffer memory on the cluster-by-cluster basis so as to be recorded on a recording track of a first optical disc and then a second optical disc. During the time interval when a cluster audio data unit next to the last cluster audio data unit written on the first optical disc by a first optical disc driver 14 is read from a memory 14, a second optical disc driver is captured into synchronization for continuously recording audio signals on the first and the second optical discs under the control of a system controller.

19 Claims, 7 Drawing Sheets

OPTICAL DISC RECORDING APPARATUS AND OPTICAL DISC REPRODUCING APPARATUS

BACKGROUND OF THE INVENTION

1. Field of the Invention

This invention relates to an optical disc recording apparatus and an optical disc reproducing apparatus enabling Tong-time recording and long-time reproduction of audio signals. More particularly, it relates to an optical disc recording apparatus and an optical disc reproducing apparatus enabling continuous recording and reproduction of audio signals on or from plural optical discs.

2. description of the Prior Art

The optical disc has a recording capacity two to three orders of magnitude higher than that of a magnetic disc, while enabling high-speed access as compared to a tape-shaped recording medium. Besides, the optical disc is excellent in durability, while enabling non-contact data recording/reproduction. For these reasons, the optical disc has come to be used extensively in recent years. One of the most well-known forms of the optical discs is a compact disc (CD).

For providing portable, above all, pocketable size headphone stereo devices, with the use of the optical disc, a CD with a disc diameter of 12 cm and a CD with a disc diameter of 8 cm (so-called CD single) have been proposed. Since the recording/reproducing apparatus is increased in size and hence is not readily portable, a disc with a diameter of 8 cm or less would be preferred. However, in attempting to construct a portable or pocketable size recording/reproducing apparatus for an optical disc 8 cm or less in diameter, the following problem arises.

In the case of a standard CD format optical disc, on which are recorded stereophonic digital PCM audio signals sampled with a sampling frequency of 44.1 kHz and quantized with 16 bits, and where these signals are exclusively reproduced by the user (CD-DA format), the reproducing time of the disc 8 cm in diameter is 20 to 22 minutes at most, so that a symphony, for example, cannot be recorded on one disc side. A playback time of 74 minutes or longer, which is approximately equal to that of a 12 cm CD, is preferred. Besides, it is not possible for the user to make recording with this CD-DA format.

On the other hand, with a CD-MO format (a format employing a recordable magneto-optical disc) as an extension of the above-mentioned standard CD-DA format, the recording/reproducing time of the 8 cm disc is only 20 to 22 minutes, as in the CD-DA format.

With the CD-I (CD-Interactive) format, levels A to C shown in Table 1 are prescribed as the modes for recording/reproducing bit-compressed digital audio signals.

TABLE 1

| LEVEL | SAMPLING FREQUENCY | NUMBER OF QUANTIZATION BITS | BANDWIDTH | PLAYBACK TIME STEREO/MONO |
|---|---|---|---|---|
| A | 37.8 kHz | 8 | 17 kHz | 2/4 |
| B | 37.8 kHz | 4 | 17 kHz | 4/8 |
| C | 18.9 kHz | 4 | 8.5 kHz | 8/16 |

When reproducing a disc recorded with e.g. the level B mode, signals obtained by quadruple bit compression of standard CD-DA format digital signals are reproduced. Thus, if all of the recorded data are compressed stereophonic audio data, playback time is quadrupled, or reproduction of 4-channel data becomes feasible, so that reproduction for 70 minutes or longer becomes possible with an optical disc 8 cm in diameter or less.

With the CD-I format, the disc is rotationally driven at the same linear velocity as that for the standard CD-DA format, so that continuous audio compressed data are reproduced at a rate of one unit to an recorded units on the disc, where n Cs a figure corresponding to the playback time or the compression rate of data, and is equal to 4 with the level B stereo mode. This unit is termed a block or sector, which Cs made up of 98 frames and has a period of 1/75 second. Therefore, with this level B stereo mode, a data string in which every fourth sector is an audio sector, such as:

$$S\ D\ D\ D\ S\ D\ D\ D\ \ldots\ \sigma$$

where S is an audio sector and D is another sector (s), is recorded on the disc. However, for actual recording, since the above data string is processed with predetermined encoding similar to that for ordinary CD format audio data, such as error correction coding and interleaving, data of the audio sector S and data of the data sector D are arranged in a scrambled fashion in the recording sectors on the disc. The other data sectors may, for example, be video or computer data. When bit-compressed audio signals are also used for the data sector D, a data string in which four-channel audio sectors S1 to S4 are cyclically arranged; that is a data string:

$$S1\ S2\ S3\ S4\ S1\ S2\ S3\ S4\ \ldots\ldots$$

is encoded and recorded on the disc. When recording and reproducing continuous audio signals, the above-mentioned 4-channel audio signals are linked sequentially beginning at the first channel and terminating at the fourth channel. More specifically, channel 1 data corresponding to the audio sector S1 are reproduced from the innermost to the outermost areas of the disc. Channel 2 data corresponding to the audio sector S2 are reproduced from the innermost to the outermost areas of the disc. Channel 3 data corresponding to the audio sector S3 are reproduced from the innermost to the outermost areas of the disc. Finally, channel 4 data corresponding to the audio sector S4 are reproduced from the innermost to the outermost areas of the disc to enable data reproduction for a continuous quadrupled time duration.

However, for the above-mentioned continuous reproduction, several track jump operations spanning the inner and outer disc peripheries are required. Since a track jump cannot be performed instantaneously, playback data are interrupted for a short time period. This means that the reproduced sound is interrupted momentarily.

For overcoming the above-described problem, the present Assignee has proposed the following technique. More specifically, when data similar to those of the above-mentioned CD-DA format, that is audio PCM data having a sampling frequency of 44.1 kHz, 16 quantization bits and a data transfer rate of 75 sectors/second, are recorded after bit compression in accordance with the B-level stereo mode, the sampling frequency of the audio PCM data with the data transfer rate of 75 sectors/second is converted to 37.8 kHz, while the number of quantization bits is reduced to 4, to produce ADPCM audio data with a data transfer rate equal to one-fourth the original rate, or 18.75 sectors/second. The B-level stereo mode ADPCM audio data, continuously outputted at the rate of 18.75 sectors/second, are written in a buffer memory. When the data volume of the ADPCM audio data stored in the buffer memory exceeds a predetermined volume K, the ADPCM data are read out from the buffer memory as recording data by the predetermined volume K in a burst fashion at a transfer rate of 75 sectors/second. These data are recorded in a continuous state on a recording track of the magneto-optical disc by address-controlling the recording positions on the recording track.

That is, in the above-mentioned recording system for the ADPCM audio data, the ADPCM audio data are continuously written in the buffer memory at a transfer rate of 18.75 sectors/second, by continuously incrementing the write pointer of the buffer memory at the transfer rate of 18.75 sectors/second. When the data volume of the ADPCM audio data stored in the buffer memory exceeds the predetermined volume K, the Pre-determined volume K of the ADPCM audio data are read out from the buffer memory as the recording data in a burst fashion at the above-mentioned transfer rate of 75 sectors/second by incrementing the read pointer of the buffer memory in a burst fashion at the transfer rate of 75 sectors/second.

On the other hand, in the reproducing system for the ADPCM data, playback data from the disc are written into the buffer memory at the transfer rate of 75 sectors/second by incrementing the write pointer of the buffer memory at the transfer rate of 75 sectors/second, while the playback data are continuously read from the buffer memory at the transfer rate of 18.75 sectors/second, by continuously incrementing the read pointer of the buffer memory at the transfer rate of 18.75 sectors/second. Writing is discontinued when the read pointer is overtaken by the write pointer. When the data volume of the playback data stored in the buffer memory is lower than a predetermined volume, the write pointer of the buffer memory is incremented in a burst fashion at the transfer rate of 75 sectors/second to again write data i n the buffer memory.

By controlling the buffer memory in this manner, the B-level stereo mode ADPCM audio data reproduced from the recording track of the magneto-optical disc are written in the buffer memory in a burst fashion at the transfer rate of 75 sectors/second, while the ADPCM audio data are continuously read from the buffer memory as playback data at the transfer rate of 18.75 sectors/second. In this manner, the playback data are continuously read from the buffer memory while the data volume exceeding the predetermined volume is maintained at al 1 times in the buffer memory. By address-controlling the playback position on the recording track of the magneto-optical disc, the audio data may be continuously reproduced from the recording track of the magneto-optical disc.

If it is attempted to record continuous audio signals, it is not possible to record only the sector S2 signals, by reason of the interleaving operation performed at the time of recording, but it becomes necessary to perform interleaving involving neighboring sectors S1 and S3 or even the sectors neighboring thereto, such that it becomes necessary to rewrite signals of the pre-recorded signals. This indicates that it is extremely difficult to record the compressed continuous audio data.

If it is possible to switch between the above-mentioned compression modes, the usage of the recording/reproducing apparatus may be enhanced advantageously. However, if the rotational speed of the disc, recording pattern or signal processing operations should be switched for each of these selected compression modes, the construction of the circuit is complicated to render it difficult to render the apparatus inexpensive. It is therefore desirable that the controlling or signal processing operations or the recording patterns be changed to the least extent with changes in the compression modes.

For overcoming the above-mentioned problem, the present Assignee has proposed a technique in which digital data are arranged into clusters at an interval of a predetermined number of, for example, 32 sectors, and e.g. five cluster-linking sectors, each longer than an interleaving length, are provided at each cluster-linking region so that data interleaving in each cluster does not affect the neighboring clusters.

Long-time recording or long-time reproduction of the audio signals becomes possible by performing bit compression of the digital audio signals before recording these digital audio signals. However, the recordable data volume on one optical disc is limited so that the maximum recording time is improved by the recording capacity of the optical disc. Although continuous recording or continuous reproduction for an extended period of time becomes possible by using plural discs one after another, signal dropout of the audio signals is produced at the time of exchange of the optical discs.

OBJECT AND SUMMARY OF THE INVENTION

Tn view of the above-described status of the art, it is an object of the present invention to provide an optical disc recording apparatus and an optical disc reproducing apparatus whereby recording and reproduction may be made continuously on plural discs without producing dropout of the audio signals.

The present invention provides an optical disc recording apparatus in which audio data obtained by digitizing analog audio signals and time base compressing the resulting digital audio signals are read from a buffer memory on a cluster-by-cluster basis so as to be recorded on a recording track of an optical-disc, and in which recording controlling means is provided whereby, during the time interval when a cluster audio data unit next to the last cluster audio data unit written on a first optical disc is read from a memory, a second optical disc driver is captured into synchronization for continuously recording audio signals on the first and the second optical discs under control by a system controller.

The present invention also provides an optical disc reproducing apparatus in which time base compressed audio data are reproduced on a cluster-by-cluster basis from a recording track on the optical disc so as to be read and outputted from a buffer memory after time base expansion, and in which playback controlling means is provided whereby, during the time the last cluster audio data unit reproduced from the first optical disc is read from the buffer memory, the playback system of the second optical disc is captured into synchronization for continuously reproducing the first optical disc and the second optical disc.

With the optical disc recording apparatus according to the present invention, a second optical disc driver is captured into synchronization during the time interval when a cluster audio data unit next to the last cluster audio data unit written on a first optical disc is read from a memory, for continuously recording audio signals on the first and the second optical discs under control by a system controller.

With the optical disc reproducing apparatus according to the present invention, the playback system of the second optical disc is captured into synchronization during the time the last cluster audio data unit reproduced from the first optical disc is read from the buffer memory, for continuously reproducing the first optical disc and the second optical disc.

Other objects and advantages of the present invention will become apparent from the following description.

DETAILED DESCRIPTION OF THE PREFERRED EMBODIMENTS

Figure 1:
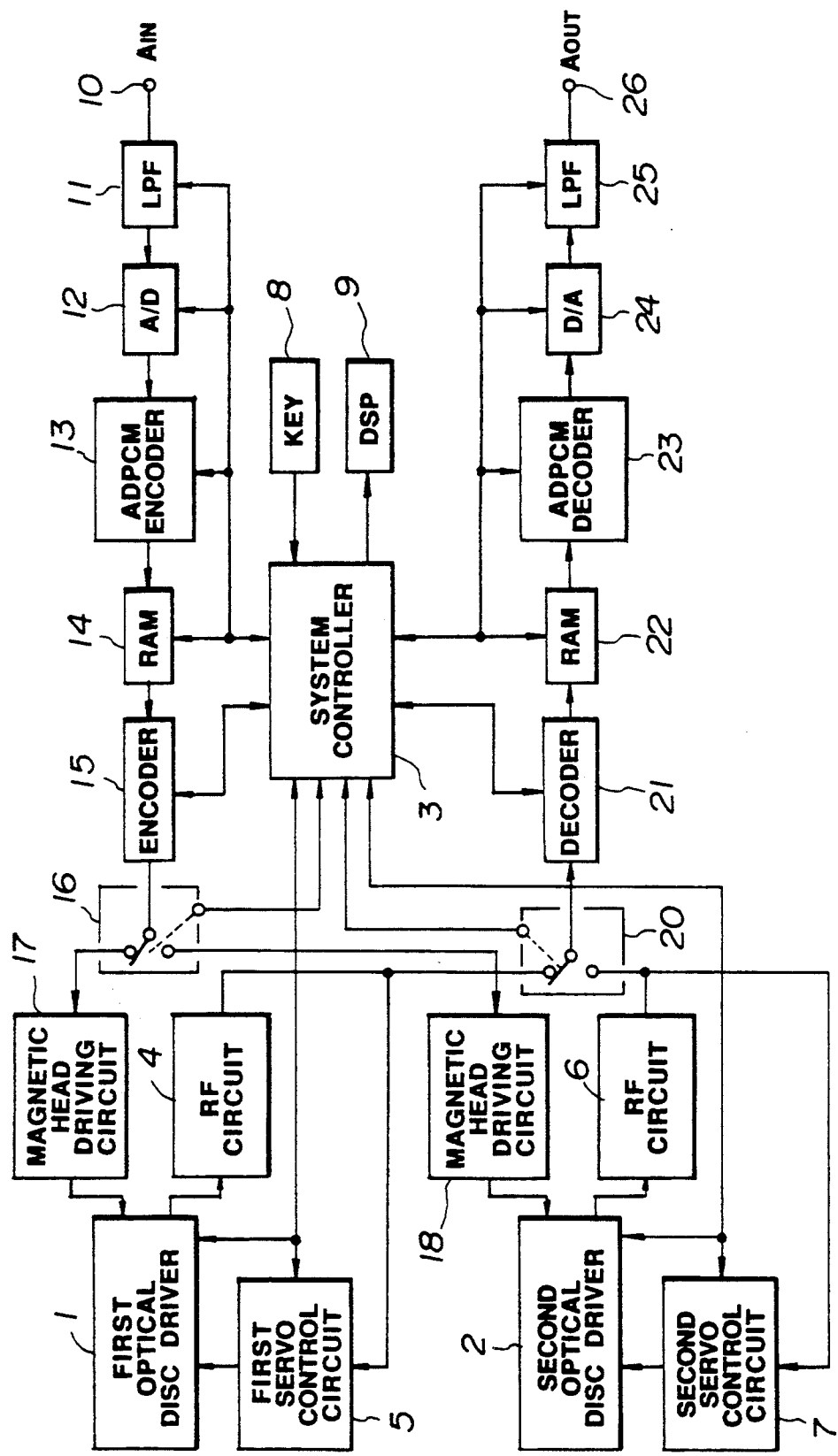
FIG. 1 is a block diagram showing an arrangement of a disc recording/reproducing apparatus embodying the present invention.

Referring to the drawings, an illustrative embodiment of the present invention will be explained in detail.

FIG. 1 shows an optical disc recording/reproducing apparatus according to the present invention in which audio signals are recorded on or reproduced from the recording track of the magneto-optical disc as digitized and time base compressed audio data. To this end, a first optical disc driver 1 and a second optical disc driver 2, each for recording/reproducing audio data on a cluster-by-cluster basis, are operatively associated with each other by a system controller 3, so that the audio signals may be continuously recorded and reproduced by these optical disc drivers 1, 2.

With the above-described optical disc recording/reproducing apparatus, the first and second optical disc drivers 1 and 2 are each operated with respect to separate magneto-optical discs so that data may be recorded along a recording track of the magneto-optical disc rotational 1 y driven by a spindle motor by magnetic field modulation recording by applying a magnetic field modulated in accordance with recording data by a magnetic head while radiating a laser beam by an optical head on the magneto-optical disc. The recorded data may also be reproduced magneto-optically by tracing the recording track of the magneto-optical disc with the laser beam by the optical head. The data recording or reproduction is performed on the basis of the cluster addresses or sector addresses pre-recorded or preformatted on the magneto-optical disc, as later described.

The optical head of each of the first and second optical disc drivers 1, 2 is made up of optical components which are not shown, such as a laser source, e.g. a laser diode, a collimator lens, an object lens, a polarization beam spitter or a cylindrical lens, and split photodetectors, and is mounted facing the magnetic head with the magneto-optical disc in-between. When recording data on the magneto-optical disc, the optical head radiates a laser light on the target track of the magneto-optical disc, on which the magnetic field modulated in accordance with the recording data is applied by the magnetic head by the magnetic head driving circuit, to performing thermomagnetic recording. The optical head also detects the laser light reflected from the target track for detecting focusing errors by, for example, a so-called astigmatic method and tracking errors by, for example, a so-called push-pull method. When reproducing recorded data from the magneto-optical disc, the optical head detects the difference in the polarization angle of the reflected light from the target track (Kerr rotation angle) for producing playback signals. The optical head also reproduces cluster addresses and sector addresses pre-formatted as pits along with e.g. synchronization signals at the leading end of each sector.

The playback output obtained from the optical head of the first optical disc driver 1 is transmitted to a first RF circuit 4. The first RF circuit 4 extracts the tracking signals and the focusing signals from the output of the optical head to transmit the extracted signals to a first servo control circuit 5, while converting the playback signals into corresponding binary signals and transmitting the converted binary signals to a decoder 21 of the reproducing system via changeover switch 20. The first RF circuit 4 also transmits the cluster and sector addresses to the system controller 3.

The above-mentioned first servo control circuit 5 servo-controls the above-mentioned first optical driver 1 and comprises, for example, a focusing servo control circuit, a tracking servo control circuit, a spindle motor servo control circuit and a thread servo control circuit. The focusing servo control circuit effects focusing control of an optical system of the optical head so that the focusing error signal will be reduced to zero. The tracking servo control circuit executes tracking control of the optical system of the optical head so that the tracking error signal will be reduced to zero. The spindle motor servo control circuit controls the spindle motor so that the magneto-optical disc is rotationally driven at a predetermined rotational velocity, such as at a constant linear velocity. The thread servo control circuit shifts the optical head and the magnetic head to a target track position of the magneto-optical disc designated by system controller 3. The first servo control circuit 5, performing these various control operations, transmits the information indicating the operating states of various components of the first optical disc driver 1 to the system controller 3.

The playback output obtained from the optical head of the second optical disc driver 2 is transmitted to a second RF circuit 6. The second RF circuit 6 extracts the tracking signals and the focusing signals from the output of the optical head to transmit the extracted signals to a second servo control circuit 7, while converting the playback signals into corresponding binary signals and transmitting the converted binary signals to the decoder 21 of the reproducing system via changeover switch 20. The second RF circuit 6 also transmits the cluster and sector addresses to the system controller 3.

The above-mentioned second servo control circuit 7 servo-controls the above-mentioned second optical driver 2 and comprises, for example, a focus servo control circuit, a tracking servo control circuit, a spindle motor servo control circuit and a thread servo control circuit. The focusing servo control circuit effects focusing control of an optical system of the optical head so that the focusing error signal will be reduced to zero. The tracking servo control circuit executes tracking control of the optical system of the optical head so that the tracking error signal will be reduced to zero. The spindle motor servo control circuit controls the spindle motor so that the magneto-optical disc is rotationally driven at a predetermined rotational velocity, such as at a constant linear velocity. The thread servo control circuit shifts the optical head and the magnetic head to a target track position of the magneto-optical disc designated by the system controller 3. The second servo control circuit 7, performing these various control operations, transmits the information indicating the operating states of various components of the second optical disc driver 2 to the system controller 3.

A key input operating unit 8 and a display 9 are connected to the system controller 3, which controls the recording system and the reproducing system with an operating mode designated by the operating input information from the key unit 8. On the basis of the cluster and sector addresses reproduced from the magneto-optical disc by the first and second optical disc drivers 1, 2, system controller 3 controls the recording and reproducing positions on the recording track traced by the optical and magnetic heads of the first and second optical disc drivers 1, 2. On the basis of the bit compression mode information at the ADPCM encoder 13, selected by the key input operating section 8, and the bit compression mode information in the reproduced data obtained by the reproducing system by the first and second RF circuits 4, 6, system controller 3 causes the bit compression mode to be displayed on a display 9. Also, on the basis of the cluster addresses and the bit compression rate in the bit compression mode, system controller 3 causes the play time, that is the reproducing time, to be displayed on the display 9, For displaying the reproducing time, the cluster address reproduced from the recording track of the magneto-optical disc by the first and second optical disc drivers 1 and 2 is multiplied by a reciprocal of the data compression rate in the bit compression mode, such as 4 in the case of ¼ compression, to find the actual time information, which is displayed on the display 9. Meanwhile, during recording, the current recording position may also be displayed by the actual recording time obtained by multiplying the pre-formatted cluster address, read out from the recording track, by the reciprocal of the data compression rate.

The recording system of the p resent d i sc recording-/reproducing apparatus includes an A/D converter 12 supplied with analog audio signals $A_{IN}$ from input terminal 10 via lowpass filter 11.

The A/D converter 12 quantizes the audio signals $A_{IN}$. The digital audio data obtained from the A/D converter 12 are transmitted to an ADPCM encoder 13. In the ADPCM encoder 13, the operating mode of which is designated by system controller 3, the digital audio data at the predetermined transfer rate, quantized from the audio signals $A_{IN}$ by the A/D converter 12, are processed with a data compression operation in conformity to the various modes in the CD-I system shown in Table 1. For example, in the B-level mode of Table 1, the digital audio data are processed into compressed data (ADPCM audio data) having a sampling frequency of 37.8 kHz, with the number of bits per sample equal to 4, before being supplied to a memory 14. The data transfer rate with the B-level stereo mode is reduced to one-fourth of the data transfer rate of 75 sectors/second of the standard CD-DA format, or to 18.75 sectors/second.

In the optical disc recording/reproducing apparatus, shown in FIG. 1, it is assumed that the sampling frequency of the A/D converter 12 is fixed at the sampling frequency of the standard CD-DA format, or 44.1 kHz, and that, in the ADPCM encoder 13, bit compression from 16 to 4 bits is performed after converting the sampling rate in conformity with the compression mode, for example, from 44.1 kHz to 37.8 kHz for level B. Alternatively, the sampling frequency of the A/D converter 12 itself may be switchingly controlled as a function of the compression modes. In this case, the cut-off frequency of the lowpass filter 11 is also switchingly controlled as a function of the switchingly controlled sampling frequency of the A/D converter 12. That is, the sampling frequency of the A/D converter 12 and the cut-off frequency of the lowpass filter 11 may be simultaneously controlled depending on the compression modes.

The memory 14 is used as a buffer memory in which data writing and readout are controlled by system controller 3 and which temporarily stores ADPCM audio data supplied from the ADPCM encoder 13 for later recording on the disc whenever the necessity arises. Thus, in the B-level stereo mode, the compressed audio data supplied from the ADPCM encoder 13 has its transfer rate reduced to one-fourth of the standard CD-DA format data transfer rate of 75 sectors/second, or to 18.75 sectors/second, these compressed data being continuously written in memory 14. Although it suffices to record the compressed data (ADPCM data) at a rate of every four sectors, as explained above, it is practically impossible to record the data at this rate of every four sectors, so that the recording is made sector-continuously. This recording is made in a burst fashion at the same data transfer rate as that for the standard CD-DA format or 75 sectors./second, with a predetermined number of sectors, for example, 32 plus several sectors, as a recording unit. That is, the B-level stereo mode ADPCM audio data, continuously written at the low transfer rate of 18.75 (=75/4) sectors/second in conformity to the bit compression rate is read from memory 14 as recording data in a burst fashion at the transfer rate of 75 sectors/second. Although the overall data transfer rate of the data thus read out for recording, inclusive of the non-recording period, is the above-mentioned low transfer rate of 18.75 sectors/second, the instantaneous data transfer rate within the time interval of the burst-like recording operation is the above-mentioned standard rate of 75 sectors/second. Thus, when the rotational velocity of the disc is equal to that of the standard CD-DA format, or the constant linear velocity, recording is made with the same storage pattern and at the same recording density as those of the CD-DA format.

The ADPCM audio data, that is recording data, read out from memory 14 in a burst fashion at the transfer rate of 75 sectors/second, are supplied to an encoder 15. In a data string supplied from memory 14 to encoder 15, a data unit continuously recorded with each recording is composed of a cluster of, for example, 32 sectors, and several cluster-linking sectors arrayed before and after each cluster. The cluster-linking sector has a length longer than the interleaving length at the encoder 15, so that interleaving of a given cluster does not affect data of neighboring clusters. Details of recording on the cluster-by-cluster basis will be explained later referring to FIG. 2.

In the encoder 15, the recording data supplied in a burst fashion from memory 14 are processed with error-correction coding, such as by parity addition and interleaving, or 8-to-14 modulation (EFM) . The recording data, thus processed with encoding by encoder 15, are supplied via changeover switch 16 to magnetic head recording circuits 17, 18 of the first and second optical disc drivers 1, 2, respectively.

The magnetic head driving circuits 17, 18 are connected to the magnetic heads of the first and second optical disc drivers 1, 2 for driving these magnetic heads for applying magnetic fields conforming to the recording data to the magneto-optical disc.

The system controller 3, controlling the memory 14 in the above-described manner, controls the recording position so that the recording data read out in the burst fashion from memory 14 may be continuously recorded on the recording track of the first magneto-optical disc by the first optical disc driver 1. During the time which elapses until reading from memory 14 of a cluster audio data unit following the very last cluster audio data written on the recording track of the magneto-optical disc unit by the first optical disc driver 1, system controller 3 captures the second optical disc driver 2 into synchronization with the first optical disc driver 1 to continue recording on the recording track of the second magneto-optical disc.

Recording control by system controller 3 is performed by controlling the recording position of the recording data read out in the burst fashion from memory 14 based on the cluster and sector addresses and by supplying control signals designating the recording position on the magneto-optical disc to the first and second servo control circuits 5, 7.

The reproducing system of the present disc recording/reproducing system is hereinafter explained.

The reproducing system is designed to reproduce the recording data continuously recorded on the recording track of each magneto-optical disc by the first and second optical disc drivers 1, 2, and includes a decoder 21 to which the playback output obtained on tracing the recording tracks each of the magneto-optical discs by the optical heads of the first and second optical heads 1, 2 with a laser light is supplied via changeover switch 20 after conversion into corresponding binary signals by the first and second RF circuits 4, 6.

The decoder 21 is a counterpart of the encoder 15 of the above-described recording system and effects processing, such as decoding for error correction and 14-to-8 demodulation, on the binary playback output from the first and second RF circuits 4, 6 for reproducing the above-mentioned B-level stereo mode ADPCM audio data at a transfer rate of 75 sectors/second which is faster than the normal transfer rate for the B-level stereo mode. The playback data produced by decoder 21 are supplied to a memory 22.

The memory 22 has data writing and readout controlled by system controller 3 so that the playback data supplied from decoder 21 at the transfer rate of 75 sectors/second are written therein in the burst fashion at the transfer rate of 75 sectors/second. The playback data written in memory 22 in the burst fashion at the transfer rate of 75 sectors/second are also read out continuously from memory 22 at the normal B-level stereo mode transfer rate of 18.75 sectors/second.

The system controller 3 controls the memory 22 so that the playback data are written in memory 22 at the transfer rate of 75 sectors/second, while being continuously read from memory 22 at the transfer rate of 18.75 sectors/second.

The system controller 3, controlling the memory 22 in the above-described manner, controls the playback position so that the playback data written in a burst fashion in memory 22 by the memory control may be continuously reproduced from the recording track of either magneto-optical disc. After reproducing the data recorded on the first magneto-optical disc, during the time until the last cluster audio data unit read on the cluster-by bluster basis from the first magneto-optical disc by the first optical disc driver 1 are read out from memory 22, system controller 3 captures the second optical disc driver 2 into synchronization for thereafter continuously reproducing the audio data from the recording track of the second magneto-optical disc by the second optical disc drivers 2.

The system controller 3 performs playback control by controlling the reproducing position of the reproduced data read out in a burst fashion from memory 22 based on the cluster and sector addresses and supplying control signals designating the reproducing position on the recording track of the magneto-optical disc to the first and second servo control circuits 5, 7.

The B-level stereo mode ADPCM audio data, produced as playback data continuously read from memory 22 at the transfer rate of I 8.75 sectors/second, are supplied to ADPCM decode r 23.

The ADPCM decoder 23, which is a counterpart of the ADPCM encoder 13, has its operating mode specified by system controller 3, and expands the B-level stereo mode ADPCM audio data by a factor of four to reproduce the CD-DA mode digital audio data. These digital audio data are transmitted by the ADPCM decoder 23 to a D/A converter 24.

The D/A converter 24 converts the digital audio data supplied from ADPCM decoder 23 into corresponding analog audio signals $A_{OUT}$. The analog audio signals $A_{OUT}$, obtained from D/A converter 24, are outputted via lowpass filter 25 at an output terminal 26.

The recording/reproducing operation by the above-described disc recording/reproducing apparatus will be hereinafter explained in detail.

Figure 2:
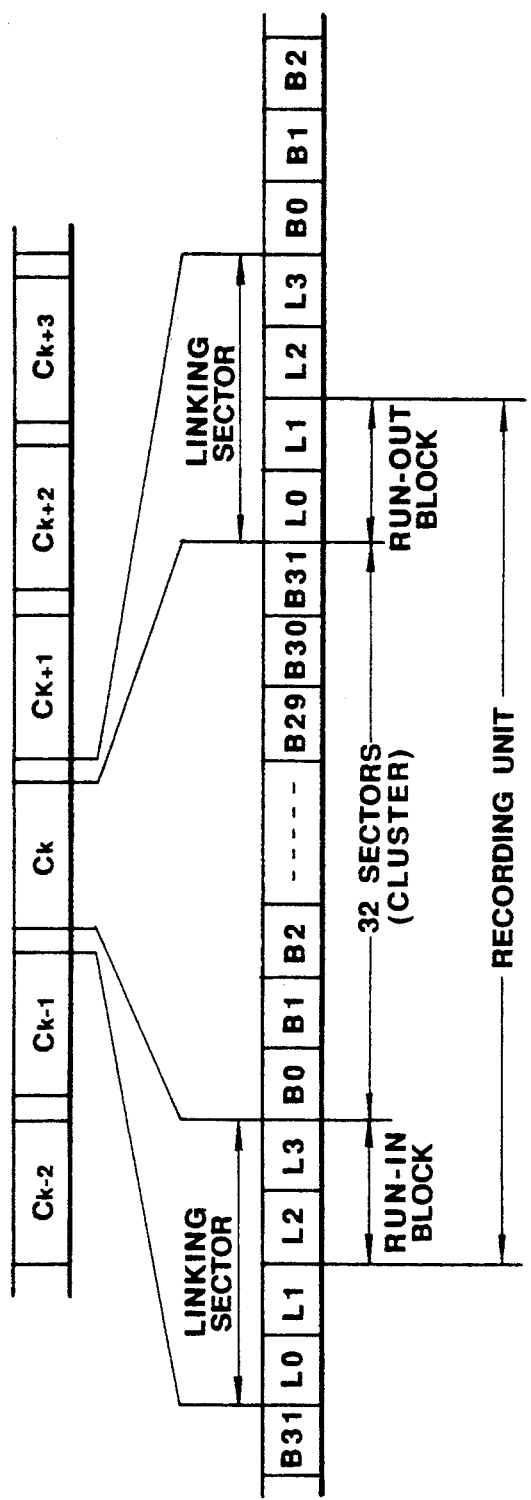
FIG. 2 shows a signal format of a cluster as a recording unit in the disc recording/reproducing apparatus shown in FIG. 1.

The recorded data, that is data read from memory 14, are arranged into clusters at an interval of a predetermined number of sectors or blocks, with several cluster-linking sectors interposed between adjacent clusters. Specifically, as shown in FIG. 2, each cluster C is made up of 32 sectors or blocks B0 to B31, and e.g. four linking sectors L0 to L3 are arrayed between the cluster C and the neighboring cluster, as shown in FIG. 2. For recording one such cluster, such as a K'th cluster $C_k$, not only the sector 32 sectors B0 to B31 of the cluster $C_k$, but also four linking sectors, that is two sectors before the cluster $C_k$, namely sectors L2 and L3 (run-in blocks) and two sectors after the cluster $C_k$, namely sectors L0, L1 (run-out blocks, totalling 36 sectors, are recorded as one recording unit. The 36 sectors of recorded data are transmitted from memory 14 to encoder 15 where the data are interleaved for an interval of 108 frames at the maximum, corresponding to about 1.1 sectors. It is noted that data within the cluster $C_k$ are within the extent of from the run-in blocks L2, L3 to the run-out blocks L0, L1 and thus do not affect the remaining clusters $C_{k-1}$ or $K_{k+1}$. Meanwhile, the linking sector L3 is composed of sub-data.

Figure 3:
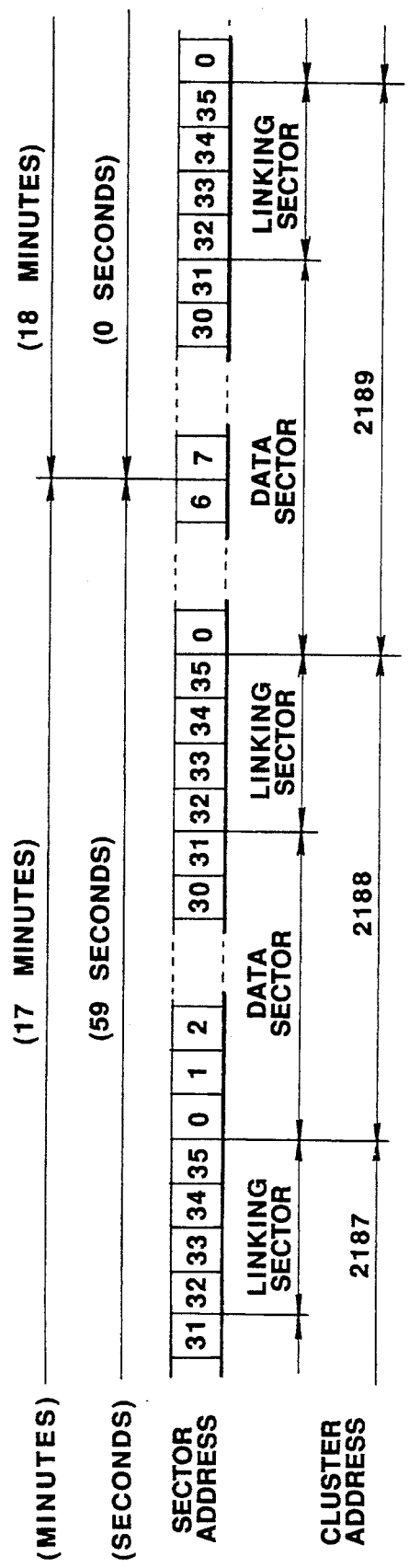
FIG. 3 shows the relation between the cluster, cluster address and the sector address in the disc recording/reproducing apparatus shown in FIG. 1.

For cluster by cluster recording, a cluster address for identifying each cluster and a sector address for identifying each sector in the cluster are preformatted as pits at the leading end of each sector, so that recording may be made on the basis of the cluster and sector addresses obtained by reproducing these pits. Referring to FIG. 3, a cluster is made up of 32 data-recording sectors and 4 linking sectors, and cells 0000 to 21XX are allocated to cluster addresses while cells 0 to 35 are allocated to sector addresses. These cluster and sector addresses are reproduced during recording and the recording position on the recording track is controlled based on the cluster and sector addresses reproduced during recording. Meanwhile, the cluster and sector addresses may also be preformatted with an offset of the recording track radially of the disc.

By performing the cluster by cluster recording in this manner, it becomes unnecessary to take account of interference with other clusters by interleaving, so that data processing may be simplified significantly. If data cannot be recorded accurately during recording due to malfunction such as defocusing or derracking, the data may be re-recorded on the cluster-by-cluster basis. On the other hand, if data cannot be read effectively during reproduction, the data may be re-read on the cluster-by-cluster basis.

Figure 4:
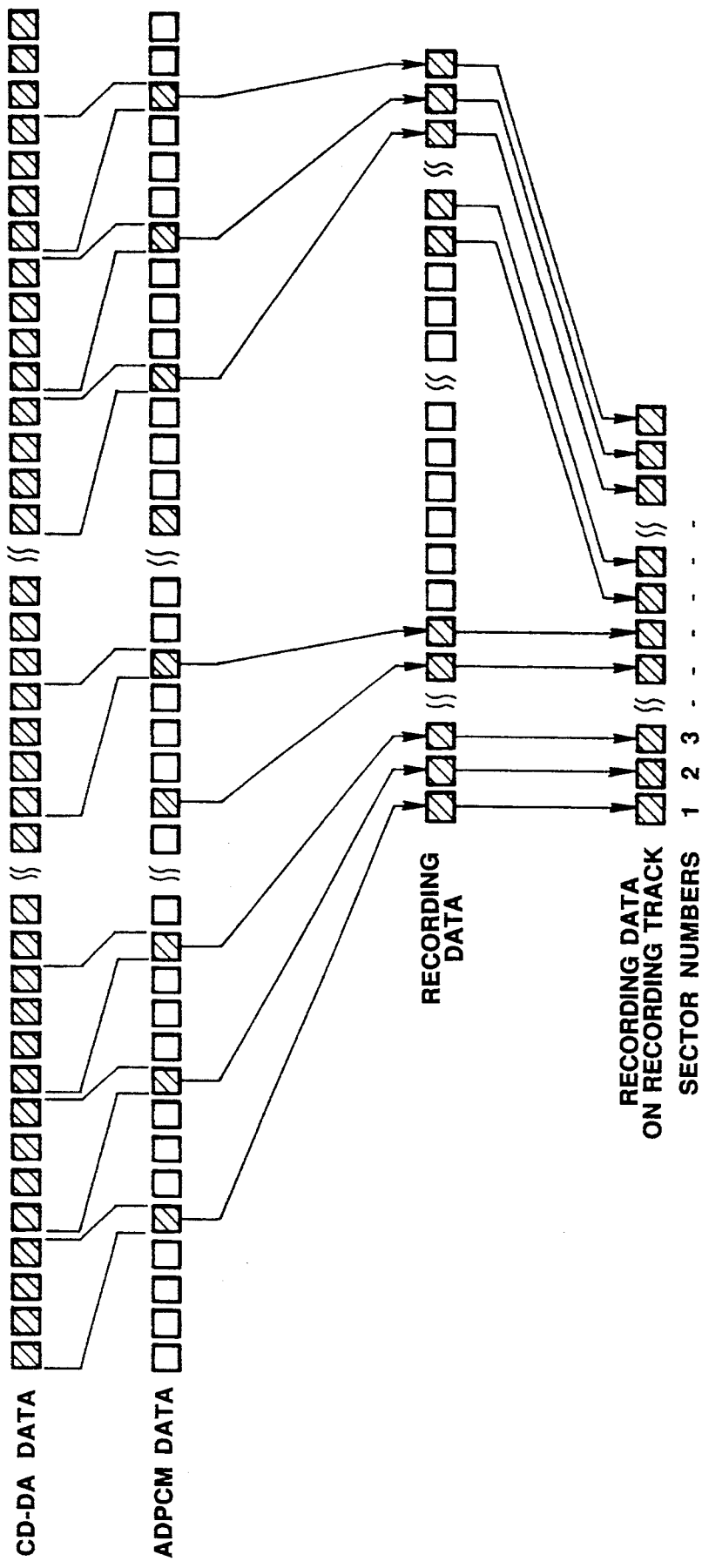
FIG. 4 shows a data format employed in the recording/reproducing apparatus.

Tn the recording system of the disc recording/reproducing apparatus, shown in FIG. 1, digital data obtained from A/D converter 12 are the audio PCM data having the sampling frequency of 44.1 kHz, the number of quantization bits of 16 and the data transfer rate of 75 sectors/second, similar to the CD-DA format data, as shown in FIG. 4. If these audio PCH data are supplied to the ADPCM encoder 13 for bit compression in accordance the B-level stereo mode, the sampling frequency is converted to 37.8 KHz and the number of quantization bits is converted to 4 so that the audio PCN data are outputted as ADPCM audio data having the data transfer rate which is one-fourth the abovementioned data transfer rate of 75 sectors/second, namely the data transfer rate of 18.75 sectors/second. The B-level stereo mode ADPCM audio data, continuously outputted from the ADPCM encoder 13 at the transfer rate of rate of 18.75 sectors/second, are transmitted to memory 14.

Figure 5:
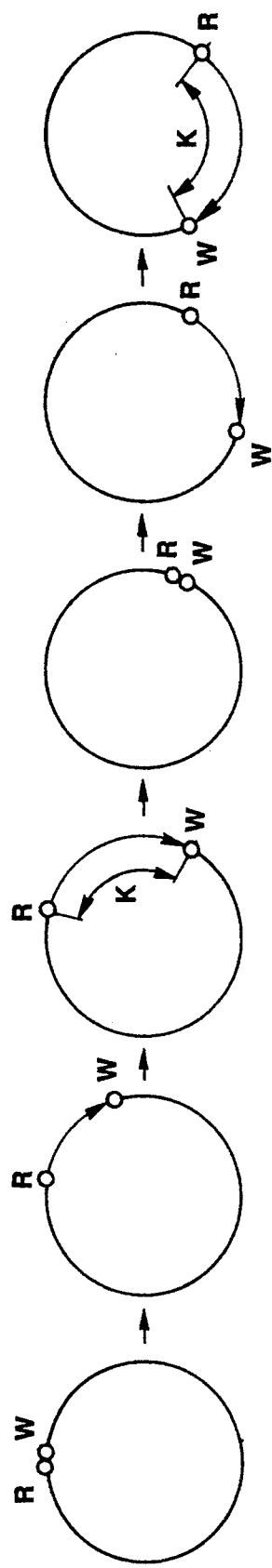
FIG. 5 shows the state of memory control in the recording system of the disc recording/reproducing apparatus shown in FIG. 1.

Referring to FIG. 5, the system controller 3 controls the memory 14 by continuously incrementing the write pointer W of the memory 14 at the transfer rate of 18.75 sectors/second for continuously writing the ADPCM audio data in memory 14 at the transfer rate of 18.75 sectors/second. The system controller 3 also controls the memory 14 by incrementing the read pointer R of the memory 14 in a burst fashion at the transfer rate of 75 sectors/second, when the data volume of the ADPCM audio data stored in memory 14 exceeds a volume K, for reading out the ADPCM audio data from memory 14 as recording data in the predetermined data volume K.

That is, in the recording system of the disc recording/reproducing apparatus, shown in FIG. 1, the system controller 3 controls the memory 14 so that the ADPCM audio data, continuously outputted from ADPCM encoder 13 at the transfer rate of, for example, 18.75 sectors/second, are written in memory 14 at the above-mentioned transfer rate of 18.75 sectors/second. When the volume of the ADPCM audio data stored in memory 14 exceeds the predetermined volume K, the ADPCM audio data stored in memory 14 are read out as recording data in a burst fashion at the transfer rate of 75 sectors/second, In this manner, the input data may be written continuously in memory 14 while a data write area in excess of the predetermined volume is perpetually maintained in memory 14.

Meanwhile, the recorded data read out in a burst fashion from memory 14 may be continuously recorded on the recording track of each magneto-optical disc by controlling the recording position on the recording track of each magneto-optical disc by the first and second optical disc drivers 1, 2 by system controller 3 on the basis of the cluster and sector addresses. Moreover, since a data writing region in excess of a predetermined volume is perpetually maintained in memory 14, input data may be continuously recorded in this data writing region, even if system controller 3 detects that track jumps have occurred by disturbances to interrupt the recording operation on the magneto-optical disc. During this time, a resetting operation of re-recording at the interrupted recording position may be performed based on the cluster address, so that the input data may be continuously recorded on the recording track of the magneto-optical disc. The current position may be displayed in terms of the actual recording time by multiplying the read-out cluster address by a reciprocal of the data compression rate and 32/75.

Figure 6:
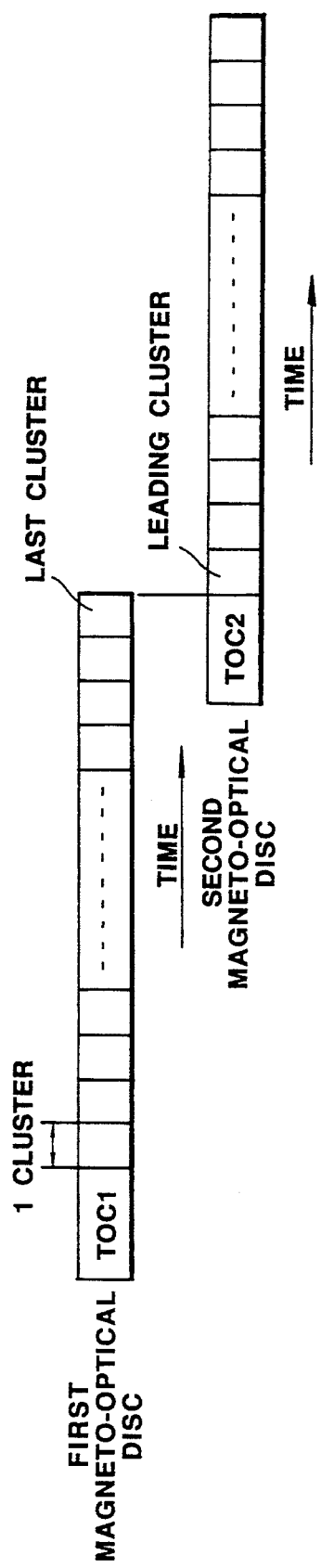
FIG. 6 shows the recording state of continuous recording on two magneto-optical discs by the recording system of the disc recording/reproducing apparatus shown in FIG. 1.

The recording position on the recording track of each magneto-optical disc by the first and second optical disc drivers 1, 2 may be controlled on the basis of the cluster and sector addresses so that the second optical disc driver 2 is captured into synchronization with the first optical disc driver 1 to change over the switch 16 after the last cluster audio data unit is written by the first optical disc driver on the first magneto-optical disc, so that, as shown in FIG. 6, cluster audio data are written by the second optical disc driver 2 on the second magneto-optical disc starting from the cluster audio data unit subsequent to the last cluster audio data unit written by the first optical disc driver 1 on the first magneto-optical disc.

Tn the system controller 3, the time when the last cluster of the first magneto-optical disc is reached is calculated by the system controller 3 from the total number of clusters recorded in the TOC area of the first magneto-optical disc on which the recording is made by the first optical disc driver 1 for setting the timing of capturing the second optical disc driver 2 for starting the recording by the second optical disc driver 2. Index data or the like indicating that there are main data to be recorded on the second magneto-optical disc in continuation from the first magneto-optical disc are recorded in the TOC area of the first magneto-optical disc. Similarly, timing data or the like for specifying the leading cluster to be connected from the first magneto-optical disc are recorded in the TOC area of he second magneto-optical disc on which recording is made by the second optical disc driver 2.

In this manner, in the optical disc recording apparatus according to the present invention, the recording system of the second optical disc is captured into synchronization, during the time just prior to when the cluster audio data unit subsequent to the very last cluster audio data to be recorded on the first magneto-optical disc is read from the buffer memory, for continuously recording audio signals on the first magneto-optical disc and then the second magneto-optical disc, so that the audio signals may be continuously recorded on plural optical discs continuously for prolonged time.

Figure 7:
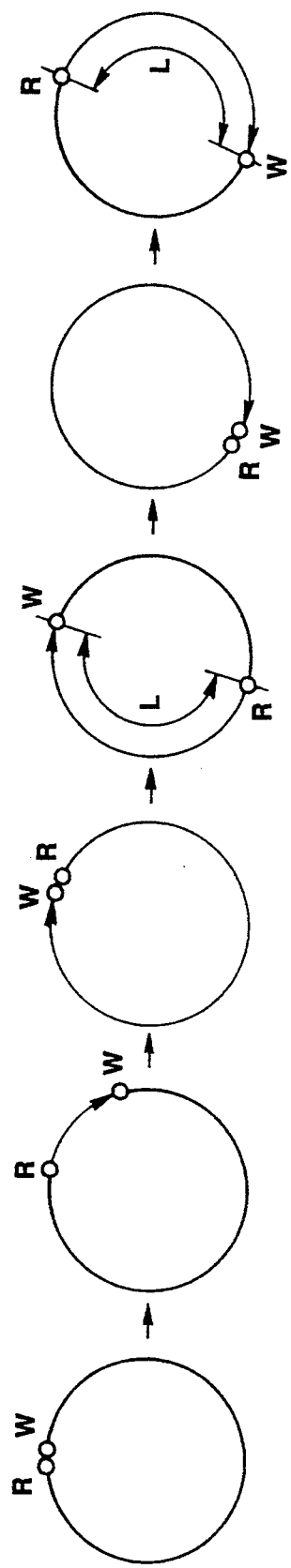
FIG. 7 shows the state of memory control i n the reproducing system of the recording/reproducing apparatus shown in FIG. 1.

Referring not to FIG. 7, in the playback system of the disc recording/reproducing system, shown in FIG. 1, the system controller 3 increments the write pointer W of the memory 22 at the transfer rate of 75 sectors/second to write the playback data in the memory 22 at the transfer rate of 75 sectors/second, while continuously incrementing the read pointer R of the memory 22 at the transfer rate of 18.75 sectors/second to continuously read the playback data from memory 22 at the transfer rate of 18.75 sectors/second. When the write pointer W overtakes the read pointer R, the system controller 3 discontinues writing. When the data volume of the playback data stored in memory 22 is lower than a predetermined volume L, system controller 3 increments the write pointer W of the memory 22 in a burst-like manner at a transfer rate of 75 sectors/second to write the playback data, by way of performing control of the memory 22.

Thus, in the above-described reproducing system of the disc recording/reproducing apparatus, the B-level stereo mode ADPCM audio data reproduced from the recording track of the magneto-optical disc are written in a burst-like manner in the memory 22, while the ADPCM audio data are continuously read from memory 14 as playback data at the transfer rate of 18.75 sectors/second, by the above-described memory control by the system controller 3, so that the playback data may be continuously read from memory 22 while the data in excess of the predetermined volume L is perpetually maintained in memory 22. On the other hand, the playback data read out in a burst-like manner from memory 22 may be continuously reproduced from the recording track of the magneto-optical disc by controlling the reproducing position on the recording track of the magneto-optical disc by the system controller 3 on the basis of the cluster addresses and the sector addresses. Besides, since the data in excess of the predetermined volume L are perpetually maintained in memory 22, as described hereinabove, data stored in excess of the volume L may be read from memory 22 to continue outputting analog audio signals, even when system controller 3 detects a track jump etc by disturbances etc to discontinue the reproducing operation from the magneto-optical disc, During this time, the resetting operation of again performing the reproduction at the interrupted reproducing position may be performed on the basis of the cluster addresses. In addition, during the time when the very last of the cluster audio data reproduced from the first magneto-optical disc by the first optical disc driver 1 are read from memory 22, the second optical disc driver 2 is captured into synchronization with the first optical disc driver 1, so that, after the above-mentioned last data are read out, the changeover switch 20 is changed over to link the reproducing operations. In this manner, audio signals may be continuously reproduced without signal dropout across plural optical discs to perform continuous reproduction for a prolonged time. Furthermore, by reading the last cluster address of a piece of music, and multiplying the cluster address by 32/75 and a reciprocal of the data compression factor, the play time may also be displayed.

It is to be noted that the present invention is not limited to the above-described embodiments. For example, although the disc recording/reproducing apparatus has been described above in connection with recording/reproduction of the B-level stereo mode ADPCM audio data, recording/reproduction may also be made in the similar manner with other mode ADPCM audio data in other CD-I systems. The data compression system also is not limited to the ADPCM system. The number of sectors making up the cluster also is not limited to 32 but may for example be 64. Also, by using e.g. 4 Mbit buffer memories as the above-mentioned memories 14, 22, about 12 second audio data may be stored therein, so that, by exchanging optical discs by a disc changer and capturing the recording system of the second optical disc into synchronization during this 12 second interval, recording or reproduction may be made continuously without signal dropout by a single optical disc driver over plural optical disc drivers.

What is claimed is:

1. A disc recording apparatus for recording input data on a series of disc-shaped recording medium, comprising:

memory means in which continuously inputted input data are sequentially written and from which the input data are read out as recording data at a transfer rate faster than the transfer rate at which the input data are written therein, recording means for recording the recording data read from the memory means on a first disc-shaped recording medium and then a second disc-shaped recording medium, each of the first disc shaped recording medium and the second disc-shaped recording medium being rotationally driven at a predetermined velocity, recording controlling means for effecting readout control of the memory means so that, when the data volume of the input data stored in the memory means exceeds a first predetermined volume, the recording data f the first predetermined volume is read out continuously from the memory means so that a writing space in excess of a second predetermined volume is maintained at all times in the memory means, the recording controlling means also effecting recording position control so that the recording data of the first predetermined volume read out in a burst-like manner from the memory means by the readout control of the memory means are continuously recorded on a recording track on the first disc-shaped recording medium and then on a recording track on said second disc-shaped recording medium, and linking controlling means for capturing control of a recording system of the second disc-shaped recording medium during a time interval between when data are last recorded on the first disc-shaped recording medium and data are next read from the memory means so that data are continuously recorded on the first disc-shaped recording medium and on the second disc-shaped recording medium.

2. A disc recording apparatus as claimed in claim 1 wherein the first predetermined volume is in excess of a minimum recording unit of the recording data.

3. A disc recording apparatus as claimed in claim 2 wherein the recording controlling means discontinues reading of the recording data from the memory means when the recording means is in an unrecordable state, the recording controlling means reading data which the recording means has become unable to record from the memory means after the recording means is reset to a recordable state, the recording controlling means recording the read data in continuation to recording data preceding the data which the recording means has become unable to record.

4. A disc recording apparatus as claimed in claim 3 wherein the second predetermined volume is in excess of an input data volume inputted in the memory means during the time of resetting from the unrecordable state to the recordable state.

5. A disc recording apparatus as claimed in claim 1 wherein the input data are time base compressed data.

6. A disc recording apparatus as claimed in claim 1 wherein information indicating that data recorded on the first disc-shaped recording medium are continuous with data to be recorded on the second disc-shaped recording medium is recorded in a predetermined area of the first disc-shaped recording medium.

7. A disc recording apparatus as claimed in claim 1 wherein information indicating that data are continuous from the first disc-shaped recording medium is recorded in a predetermined area of the second disc-shaped recording medium.

8. A disc recording apparatus as claimed in claim 1 wherein the linking controlling means starts capturing the disc-shaped recording medium into synchronization responsive to a last address pre-recorded on the first disc-shaped recording medium and a current recording address.

9. A disc recording apparatus as claimed in claim 1 wherein the first disc-shaped recording medium and the second disc-shaped recording media are exchanged using a disc changer.

10. A disc reproducing apparatus for reproducing recorded data continuously recorded on a series of disc-shaped recording medium, comprising reproducing means for producing playback data by rotating each of a first disc-shaped recording medium and a second disc-shaped recording medium at a predetermined velocity and sequentially reading the recorded data from the first disc-shaped recording medium and then the second disc-shaped recording medium at a second transfer rate faster than a first transfer rate required to reproduce playback output data, memory means in which the playback data read by the reproducing means are sequentially written at the second transfer rate and from which the sequentially written playback data are continuously read as the playback output data at the first transfer rate, playback controlling means for effecting writing controlling of the memory means for writing the playback data of a second predetermined volume when a volume of the playback data stored in the memory means becomes less than a first predetermined volume so that a volume of the playback data in excess of the first predetermined volume is perpetually maintained in the memory means, the playback controlling means also effecting playback position controlling so that the playback data are sequentially and discontinuously written in the memory means, and linking controlling means for capturing control of a recording system of the second disc-shaped recording medium during a time interval immediately subsequent to when data last recorded on the first disc-shaped recording medium are reproduced on the first disc-shaped recording medium are read from the memory means as playback output data, to reproduce playback output data continuously from the first disc-shaped recording medium and then the second disc-shaped recording medium.

11. A disc recording apparatus as claimed in claim 10 wherein the second predetermined volume is in excess of a minimum recording unit of the recording data recorded on the first disc-shaped recording medium.

12. A disc reproducing apparatus as claimed in claim 11 wherein the reproducing controlling means discontinues writing of the playback data in the memory means when the reproducing means is in an unreproducible state, the reproducing controlling means reading data which the recording means has become unable to reproduce from the first disc-shaped recording medium or the second disc-shaped shaped recording medium after the reproducing means is reset to a reproducible state to produce additional playback data, the reproducing controlling means writing the additional playback data in the memory means in continuation to playback data preceding the data which the recording means has become unable to reproduce.

13. A disc recording apparatus as claimed in claim 12 wherein the first predetermined volume is in excess of playback output data volume outputted from the memory means during a time of resetting from the unrecordable state to the recordable state.

14. A disc recording apparatus as claimed in claim 10 wherein the playback data read from the recording medium are time base compressed data.

15. A disc recording apparatus as claimed in claim 10 wherein linking controlling is performed responsive to information recorded in a predetermined region of the first disc-shaped recording medium for indicating that data recorded on the first disc-shaped recording medium are continuous to data recorded on the second disc-shaped recording medium.

16. A disc recording apparatus as claimed in claim 10 wherein the linking controlling means starts capturing the second disc-shaped recording medium into synchronization responsive to a last address pre-recorded on the first disc-shaped recording medium and a current reproducing address.

17. A disc recording apparatus as claimed in claim 10 wherein the first disc-shaped recording medium and the second disc-shaped recording media are exchanged using a disc changer.

18. A disc recording apparatus as claimed in claim 1, wherein the recording means rotates the first-disc shaped recording medium and the second disc-shaped recording medium at a constant predetermined velocity at all times while recording the recording data on the first-disc shaped recording medium and the second disc-shaped recording medium.

19. A disc recording apparatus as claimed in claim 10, wherein the reproducing means rotates the fist-disc shaped recording medium and the second disc-shaped recording medium at a constant predetermined velocity at all items while reproducing the playback on the first-disc shaped recording medium and the second disc-shaped recording medium.

* * * * *